US007313958B2

(12) United States Patent
Willig et al.

(10) Patent No.: US 7,313,958 B2
(45) Date of Patent: Jan. 1, 2008

(54) ROTATIONAL RATE SENSOR

(75) Inventors: Rainer Willig, Tamm (DE); Jochen Franz, Reutlingen (DE); Burkhard Kuhlmann, Eningen (DE); Joerg Hauer, Reutlingen (DE); Udo-Martin Gomez, Leonberg (DE); Dieter Maurer, Pfullingen (DE); Christian Doering, Stuttgart (DE); Wolfram Bauer, Tuebingen (DE); Udo Bischof, Wannweil (DE); Reinhard Neul, Stuttgart (DE); Johannes Classen, Reutlingen (DE); Christoph Lang, Pliezhausen (DE); Jens Frey, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 10/471,635

(22) PCT Filed: Sep. 25, 2002

(86) PCT No.: PCT/DE02/03622

§ 371 (c)(1),
(2), (4) Date: Feb. 13, 2004

(87) PCT Pub. No.: WO03/058166

PCT Pub. Date: Jul. 17, 2003

(65) Prior Publication Data

US 2004/0123660 A1     Jul. 1, 2004

(30) Foreign Application Priority Data

Jan. 12, 2002   (DE)   .................. 102 00 947
Aug. 16, 2002   (DE)   .................. 102 37 410

(51) Int. Cl.
*G01C 19/00*   (2006.01)

(52) U.S. Cl. .................................. 73/504.12
(58) Field of Classification Search ............ 73/504.12, 73/504.04, 504.03, 504.16, 514.32, 514.38, 73/504.14
See application file for complete search history.

(56) References Cited

U.S. PATENT DOCUMENTS

| 5,600,064 | A | 2/1997 | Ward | ........................ 73/504.04 |
| 5,672,949 | A | 9/1997 | Ward | .......................... 318/609 |

(Continued)

FOREIGN PATENT DOCUMENTS

DE       195 30 007       2/1997

(Continued)

*Primary Examiner*—Hezron Williams
*Assistant Examiner*—Tamiko Bellamy
(74) *Attorney, Agent, or Firm*—Kenyon & Kenyon LLP

(57) ABSTRACT

A rotational rate sensor having a substrate and a Coriolis element is proposed, the Coriolis element being situated over a surface of a substrate; a driving arrangement being provided, by which the Coriolis element is induced to vibrations parallel to a first axis; a detection arrangement being provided, by which an excursion of the Coriolis elements is detectable on the basis of a Coriolis force in a second axis that is provided to be essentially perpendicular to the first axis; the first and second axis being parallel to the surface of the substrate; sensor elements that are designated to be at least partially movable with respect to the substrate being provided; a force-conveying arrangement being provided; the force-conveying arrangement being provided to convey a static force effect between the substrate and at least one of the sensor elements.

13 Claims, 3 Drawing Sheets

U.S. PATENT DOCUMENTS

| | | | |
|---|---|---|---|
| 5,945,599 A * | 8/1999 | Fujiyoshi et al. | 73/504.12 |
| 6,067,858 A | 5/2000 | Clark et al. | 73/504.16 |
| 6,230,563 B1 | 5/2001 | Juneau et al. | 73/504.04 |
| 6,370,937 B2 * | 4/2002 | Hsu | 73/1.37 |

FOREIGN PATENT DOCUMENTS

| | | |
|---|---|---|
| DE | 197 26 006 | 9/1998 |
| JP | 2000009475 A * | 1/2000 |
| JP | 2001304872 A * | 10/2001 |
| WO | 97 45699 | 12/1997 |
| WO | 01 71364 | 9/2001 |

\* cited by examiner

ROTATIONAL RATE SENSOR

FIELD OF THE INVENTION

The present invention is based on a rotational rate sensor.

BACKGROUND INFORMATION

Linearly vibrating vibration gyroscopes are generally known. In these rotational rate sensors, parts of the sensor structure are actively set into vibration (primary vibration) in one direction, i.e. in a first axis (x axis), which is oriented parallel to a substrate surface. At an external rotational rate about a singular sensitive axis, Coriolis forces are exerted on the vibrating parts. These Coriolis forces, which vary periodically with the frequency of the primary vibration, give rise to vibrations of parts of the sensor structure (secondary vibration) that are also parallel to the substrate surface in a second direction or second axis (y axis) which is oriented perpendicularly to the x axis. Means of detection are mounted on the sensor structure which detect the secondary vibration (Coriolis measuring effect).

SUMMARY OF THE INVENTION

In the lay-out of the rotational rate sensor, as described above, by design (choice of suitable symmetries) a singular cartesian coordinate system, K=(x,y) is specified for the primary and the secondary vibration within the plane of the substrate. The mass distributions and the spring distributions are laid out so that the principal axis system of the mass tensors and spring constant tensors for the primary and secondary vibrations coincide exactly with K. In addition, in the implementation of the means of detection, care is taken that no signals are created at the means of detection for the Coriolis effect by the operation of the sensors in the primary vibration (without external rotational rate). For this purpose, the means of detection are designed so that their singular coordinate system KD also coincides with the coordinate system of the mechanics K, i.e. it is also true that KD=(x,y). Consequently, in the case of such ideal rotational rate sensors, there is not created a bridging of the primary vibration to the detection device for the Coriolis effect. Such a bridging is called a quadrature. Thus, quadrature signals are signals to the means of detection for the Coriolis effect, which are present also without a relative movement of the sensor with respect to an external inertial system, the sensor being operated in its primary vibration.

The reason for the appearance of quadrature signals is that the coordinate system of the sensor element mechanics K=(x,y) does not coincide with the coordinate system of the means of detection KD=(x',y'), but both systems are slightly rotated with respect to each other by an angle theta.

Typical causes for this rotation are, for example, asymmetries in the sensor structure by reason of imperfections in the manufacturing process. These are able to make themselves known by asymmetrical mass distributions or asymmetrical spring constants. As a result of this, the principal axis system of the mass tensors and the spring constant tensors no longer coincide with KD.

The appearance of quadrature is not specific to the silicon technology used for the rotational rate sensors described here, having a sensor structure made of epitactically grown polysilicon. Even in vibration gyroscopes made with monocrystalline silicon material or with monocrystalline quartz, quadrature signals appear as a result of imperfections in the manufacturing process.

Quadrature interference signals in rotational rate sensors as a result of manufacturing imperfections are known, and are encountered in rotational rate sensors of the most varied technologies. In this context, according to the related art, various different methods are known for the reduction of these interference signals.

A first method, according to the related art, for suppressing quadrature signals makes use of the different phase position of rotational rate signals and quadrature signals. The Coriolis force is proportional to the speed of the primary vibration, whereas the quadrature is proportional to the excursion of the primary vibration. Consequently, there is a phase shift of 90° between the rotational rate signal and the quadrature signal. At the means of detection, quadrature signals and rotational rate signals are detected as signals amplitude-modulated with the frequency of the primary vibration. By the method of synchronous demodulation, as described in German Published Patent Application No. 197 26 006 and U.S. Pat. No. 5,672,949, the signals may first of all be demodulated again into the baseband. In addition, by a suitable choice of the phase position of the reference signal for the demodulation, the quadrature signal may be suppressed. In this method, the quadrature signal is not influenced in the sensor element itself. Furthermore, the quadrature signal also has to pass through the primary signal conversion paths in the means of detection, and it is able to be electronically suppressed only relatively late in the signal path. In the case of large quadrature signals compared to the rotational rate measuring range, this means drastically increased requirements on the dynamic range of the first signal conversion stages, and often leads to increased sensor noise.

A second method according to the related art, for reducing quadrature signals, is the physical balancing of the mechanical sensor structures. Here, in contrast to the first method, the cause of the quadrature is directly rectified by reworking the sensor element, so that no quadrature signals appear at the means of detection. In the case of precision rotational rate sensors, this is achieved actively by iterative mechanical material surface removal at different places in the sensor element. Using this method, the principal axis system of the mass or spring constant tensors for the primary and secondary vibrations are modified so that the twisting of the coordinate system of the sensor element mechanics K with respect to the coordinate system of the means of detection KD, which is present at first, is reversed. In the case of rotational rate sensors made of monocrystalline quartz material, a surface removal of material is undertaken partially by laser trimming at singular locations in the sensor element. Here too, the mass tensor or spring constant tensor is modified so that, at the end, the twisting of K with respect to KD is essentially reversed. Even in the case of micromechanical rotational rate sensors made of monocrystalline silicon, laser trimming is used on mass structures (e.g. VSG or CRS-03 from Silicon Sensing Systems Ltd.). Furthermore, for general tuning fork rotational rate sensors, laser trimming at singular spring structures within the sensor structure is generally known. Using this method, in the operation of the sensor elements in primary vibration, the principal axis system of the spring constant tensor is able to be modified until K and KD coincide, and thus the quadrature signal is eliminated.

The methods described here eliminate the quadrature in the sensor element itself, and are therefore superior to the first method, with respect to sensor performance. However, the balancing (procedure) represents a costly and often iterative as well as tedious process, and thereby a very cost-intensive process.

According to a further generally known method according to the related art, an electronic quadrature compensation is carried out in capacitative micromechanical rotational rate sensors. By doing this, the suppression of the quadrature signal is accomplished by the targeted injection of an electrical signal into the electronic transducer unit at the means of detection for the Coriolis effect. For this, the magnitude of the signal is selected so that it exactly compensates for the signal generated by the quadrature at the means of detection. In this method, analogous to the first method according to the related art, the mechanical cause for the quadrature signal itself is not eliminated. However, in contrast to the first method, in this case the quadrature signal is suppressed even before the primary signal conversion. This is able to reduce the requirements on dynamic range and noise of the primary signal conversion. However, a serious disadvantage of the method described is that it is suitable only for a very special design of the sensor evaluation electronics. This evaluation method (baseband evaluation), however, has serious disadvantages conditioned on principle (electrical distortion, etc), and therefore cannot be used in rotational rate sensors described in the present invention.

In U.S. Pat. No. 6,067,858, a further method according to the related art for electronic quadrature compensation in capacitative micromechanical rotational rate sensors is discussed. Between movable comb fingers and fixed electrodes, different electrical potentials are applied.

The rotational rate sensor according to the present invention has the advantage over the related art that, by using a special method, based on the targeted action of static forces, a reduction in the quadrature signals is achieved. In this context, electrostatic forces that are constant in time (static) are exerted on the sensor structure by electrode structures applied at suitable parts of the sensor structure and by the purposeful application of external electrical DC voltages. By the suitable application of the electrode structures (quadrature compensation structures) it is achieved that the principal axis system of sensor element mechanics K is rotated by the external electrical voltage, it being possible to set the angle of rotation by the magnitude of the voltage. Thereby the principal axis system of the sensor element mechanics K may be brought exactly to coincide with the principal axis system of the means of detection for the Coriolis effect, and consequently the quadrature is able to be suppressed. Consequently, the present invention represents a method for quadrature compensation using static forces. In this connection, the forces are generated by electrode structures applied to singular parts of the sensor structure, in such a way that an external electrical DC voltage is applied to electrodes suspended fixedly with respect to the substrate as opposed to the movable sensor structure. By the suitable application of these electrode structures (quadrature compensation structures) it is achieved that the principal axis system of the sensor element mechanics K is rotated by the external electrical voltage in such a way that it is brought exactly to coincide with the principal axis system of the means of detection for the Coriolis effect KD, and consequently the quadrature is able to be suppressed. Therefore, the present invention represents a static method for quadrature compensation. The method according to the present invention acts similarly to a mechanical balancing of the sensor structure. However, compared to the physical balancing, it has the advantage that the compensation is able to be carried out here by applying an external voltage (by balancing), and consequently a costly process step may be omitted. Moreover, the method is compatible with all conceivable sensor evaluation electronics.

DETAILED DESCRIPTION

A possible embodiment of the method according to the present invention for static quadrature compensation is shown below using as the example a micromechanical rotational rate sensor. The method may be applied to a special class of rotational rate sensors. In this context, this involves linearly vibrating vibration gyroscopes. An exemplary embodiment of the present invention is explained below, first of all the essential functional components of the rotational rate sensor being briefly described in the light of the rough illustration of FIG. 1, for an understanding of the procedure of the present invention.

Figure 1:
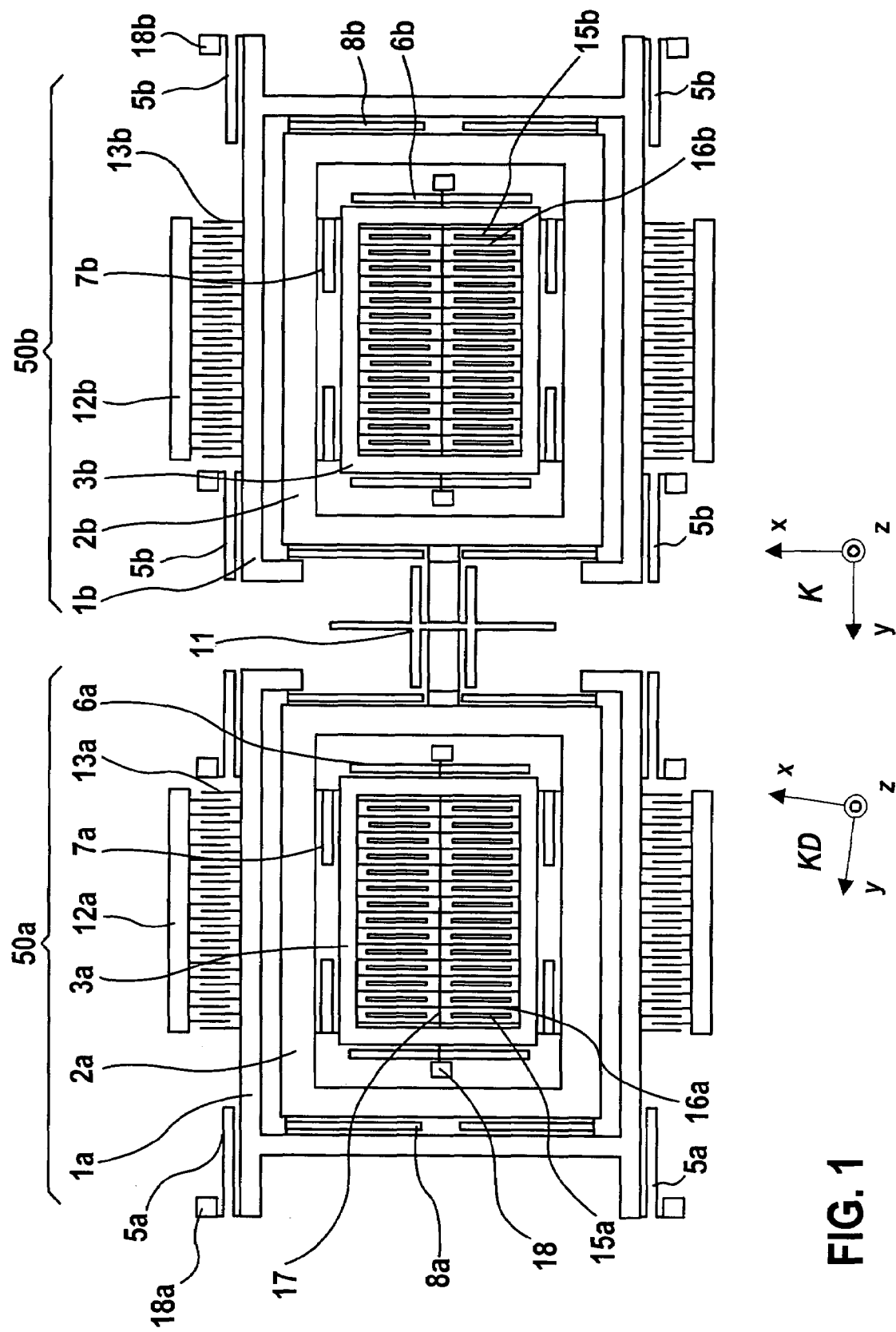
FIG. 1 shows a top view of an exemplary embodiment of a rotational rate sensor according to the present invention.

FIG. 1 shows the top view of the structured parts or rather, the structure of a rotational rate sensor or a rotational rate sensor element, the substrate lying under the particularly micromechanically structured structure of the rotational rate sensor not being shown, for reasons of clarity.

Silicon is preferably used as the material for the substrate and for the sensor elements situated above the substrate, and it is developed to be conductive by appropriate doping. The substrate may be electrically insulated where it is necessary using insulating layers. However, other materials such as ceramic, glass or metals may also be used for the rotational rate sensor according to the present invention.

The rotational rate sensor shown in FIG. 1 is designed according to the present invention particularly for production using pure surface micromechanics. What is sensed is a rotation about the normal to the substrate (the z axis), i.e. an axis which is perpendicular to the substrate surface, and which will from here on also be denoted as third axis. According to the present invention, all movable parts of the structure are essentially completely load conducting, i.e. electrically conductive.

According to the present invention, the sensor structure includes especially two preferred, symmetrically designed partial structures, which are shown in the left and right parts of FIG. 1 and are denoted as reference marks 50a and 50b. However, according to the present invention it is also possible that the sensor structure according to the present invention includes only such a partial structure 50a.

Each of the partial structures 50a, 50b includes three individual masses that are movable with respect to the substrate with which the reference coordinate system is connected. In this connection, there is provided inside the partial structures in each case a first mass as driving mass 1a, 1b. It is suspended on the substrate with springs 5a, 5b using anchoring means 18a, 18b in such a way that the driving mass can preferably execute only one in-plane motion (parallel to the plane of the substrate) in a first direction, or rather, according to a first axis (the X axis), and an in-plane motion in a second axis (the Y axis), which is perpendicular to the first axis, is suppressed. For this purpose, springs 18a, 18b are flexible in the x direction and rigid in the y direction. The first axis is also called driving axis X; the second axis is also called detection axis Y. Within partial structures 50a, 50b, a third mass, which from here on will also be called detection element 3a, 3b, is suspended with springs 6a, 6b in such a way with respect to the substrate that preferably it can execute an in-plane motion only in detection direction Y, and a motion in driving direction X is suppressed. For this purpose, springs 6a, 6b are flexible in the Y direction and rigid in the X direction.

Within partial structures 50a, 50b, in each case a second mass is connected as a Coriolis element 2a, 2b to the first mass 1a, 1b and the third mass 3a, 3b by springs 7a, 7b, 8a, 8b in such a way that Coriolis element 2a, 2b is able preferably to execute an in-plane relative motion only in the detection direction, and a relative motion in the driving direction is suppressed, and that Coriolis elements 2a, 2b is able preferably to execute an in-plane relative motion only in the x direction, and a relative motion in the y direction is suppressed, so that Coriolis element 2a, 2b is able to execute both a motion in the driving direction and the detection direction. For this purpose, springs 7a, 7b between Coriolis element 2a, 2b and detection element 3a, 3b are provided flexibly in the X direction and rigid in the Y direction. Springs 8a, 8b between Coriolis element 2a, 2b and driving mass 1a, 1b are provided flexibly in the Y direction and rigid in the X direction.

Driving mass 1a, 1b, Coriolis element 2a, 2b and detection 3a, 3b are denoted from here on in common also as movable sensor elements 1a, 1b, 2a, 2b, 3a, 3b, since they have a certain movability with respect to the substrate that is limited by the spring elements. Sensor elements 1a, 1b, 2a, 2b, 3a, 3b are particularly provided, according to the present invention, as essentially rectangular, frame-shaped structures, Coriolis element 2a, 2b surrounding detection element 3a, 3b, and driving mass 1a, 1b surrounding Coriolis element 2a, 2b.

In one sensor structure according to the present invention, having two partial structures 50a, 50b, the two Coriolis elements 2a, 2b are connected by springs 11 so that a direct mechanical coupling of partial structures 50a, 50b is present, both in the driving and the detecting direction, in such a way that the formation of parallel and antiparallel vibration modes in the x direction takes place (with participation of driving masses 1a, 1b and Coriolis elements 2a, 2b and detection elements 3a, 3b) (effective modes detection, secondary vibration).

The activation or rather, the drive of the structure (primary vibration) preferably takes place in the antiparallel driving mode (first mass 1a of first partial structure 50a moves in phase opposition to first mass 1b of second partial structure 50b). The Coriolis accelerations appearing about the z axis at an external rotation about the z axis are then also in phase opposition, and if there is an appropriate design of the structures, this leads to an activation of the antiparallel detection mode (secondary vibrations). The desired measuring effect generated thereby may then, by a suitable evaluation, be distinguished from an (undesired) measuring effect, brought on by external linear accelerations in the y direction, which would act in phase on the detection of both partial structures.

The activation of the primary vibration takes place at drive masses 1a, 1b via interdigital comb drives; also the detection of the driving motion. For this, according to the present invention, a first electrode 12a, 12b, and a second electrode 13a, 13b are provided, which generate the primary vibrations. First electrode 12a, 12b is provided rigidly connected to the substrate but electrically insulated. Second electrode 13a, 13b is connected to driving mass 1a, 1b mechanically rigidly and electrically conductive. First electrode 12a, 12b and second electrode 13a, 13b reach, in this situation, reach into each other, finger-like, and thus form a comb structure. Consequently, when a voltage is applied between the electrodes it is possible to exert a force from the substrate to driving mass 1a, 1b.

The detection of the Coriolis acceleration takes place at means of detection particularly in the form of a third and fourth electrodes inside detection elements 3a, 3b. Detection element 3a, 3b is designed for this purpose in such a way that it forms the fourth electrode as the movable part 16a, 16b of a plate capacitor device. A fixed part 15a, 16b of the plate capacitor device is denoted as the third electrode, and it is mechanically rigidly (but electrically insulatedly) connected to the substrate. In this context, the fixed part is designed as a split-up electrode, so that the whole system forms a differential plate capacitor.

In the sensor structure, detection takes place at a structure at rest (detection at rest). This specifies that detection element 3a, 3b, and consequently movable electrode 16a, 16b of the plate capacitor system, essentially does not execute a driving motion. By the subdivision of partial structures 50a, 50b of the rotational rate sensor into driving mass 1a, 1b, Coriolis element 2a, 2b and detection element 3a, 3b one achieves a two-fold decoupling of the detection motion from the driving motion.

Figure 2:
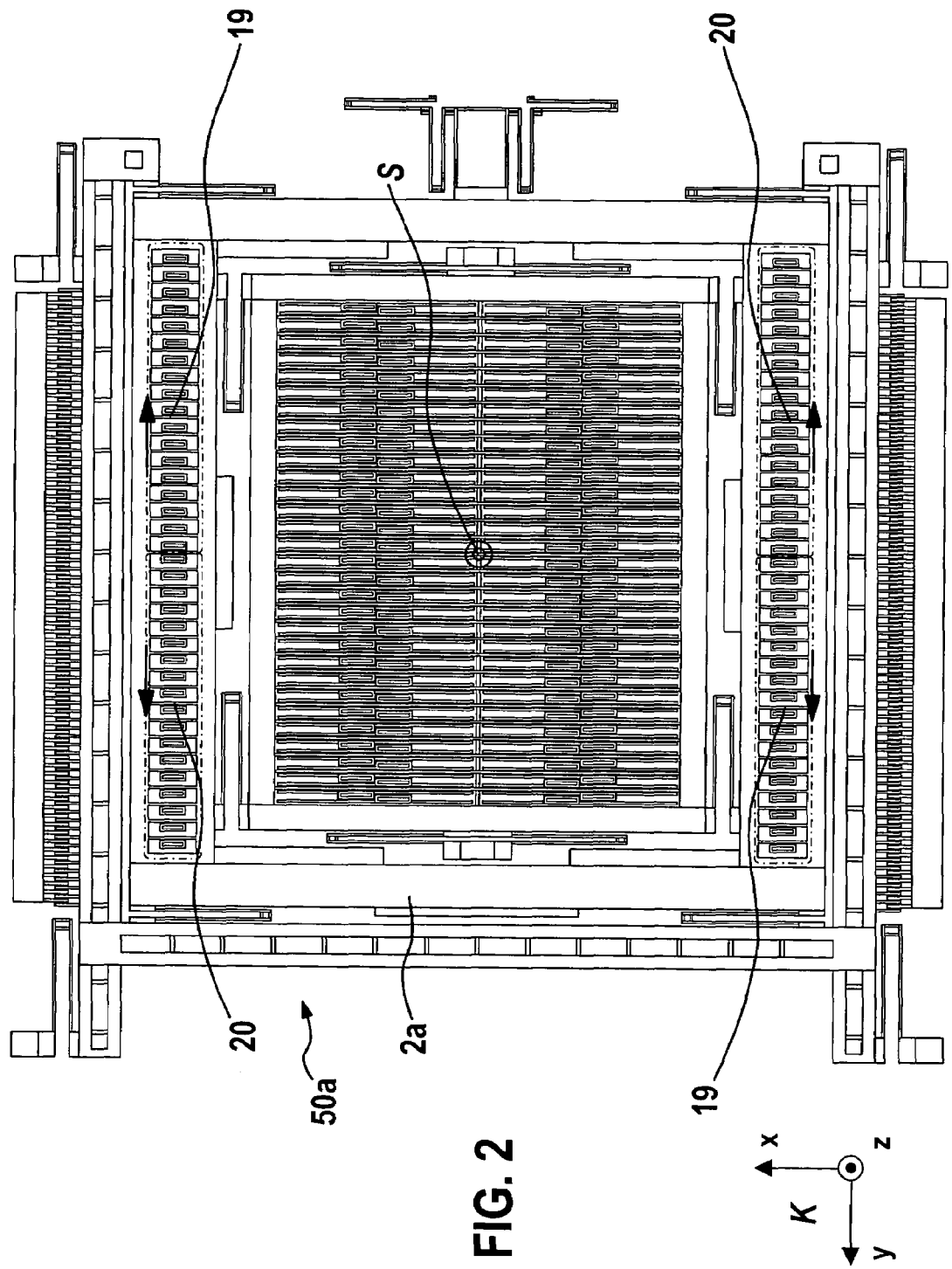
FIG. 2 shows a partial structure of a rotational rate sensor according to the present invention in a detailed view.

In FIG. 2, left partial structure 50a from FIG. 1 of a rotational rate sensor according to the present invention is shown in a detailed view. For reasons of clarity, in this case only one partial structure (the left one) of the sensor element is shown.

In the lay-out of the rotational rate sensor, by design (choice of suitable symmetries) a singular cartesian coordinate system, K=(x,y) is specified for the primary and the secondary vibration within the plane of the substrate. The mass distributions and the spring distributions should ideally be laid out so that the principal axis system of the mass tensors and spring constant tensors for the primary and secondary vibrations coincide exactly with K.

In addition, in the implementation of the means of detection, care is taken that no signals are created at the means of detection for the Coriolis effect by the operation of the sensors in the primary vibration (without external rotational rate). For this purpose, the means of detection are designed so that their singular coordinate system KD also coincides with the coordinate system of the mechanics K, i.e. it is also true that KD=(x,y).

When the coordinate systems K and KD do not completely coincide, for instance, because of manufacturing fluctuations, quadrature signals may appear.

There is a difference between positive and negative quadrature signals, with respect to the Coriolis measuring effect: when left partial structure 50a in FIG. 2 moves in primary vibration in the positive x direction, and a positive external rotational rate about the z axis, the Coriolis acceleration acts in the negative y direction. A positive quadrature signal acts in the same direction, and a negative quadrature signal acts in the opposite direction.

In the rotational rate sensor according to the present invention, because of electrode structures applied at suitable parts, particularly driving mass 1a, 1b, Coriolis element 2a, 2b and detection element 3a, 3b of the sensor structures, by purposeful application of external electrical DC voltages, timewise constant (static) electrostatic forces are exerted on the sensor structure. By the suitable application of these electrode structures, which from here on are also denoted as (quadrature compensation structures), it is achieved that the principal axis system of sensor element mechanics K is rotated by the external electrical voltage, it being possible to set the angle of rotation by the magnitude of the voltage. Thereby the principal axis system of the sensor element mechanics K may be brought exactly to coincide with the principal axis system of the means of detection for the Coriolis effect KD, and consequently the quadrature is able to be suppressed. Therefore, the present invention represents a static method for quadrature compensation.

In FIG. 2 electrostatic quadrature compensation structures 19, 20 are shown as an example within Coriolis element 2a. According to the present invention, the compensation structures are provided in the form of two substructures, one first substructure 19 compensating for the positive quadrature signal, and a second substructure compensating for the negative quadrature signals. Such two substructures make sense, particularly because then a rotation of coordinate system K is able to be effected both in the positive and in the negative direction, since, according to the present invention, especially attractive forces are exerted via electrostatic forces.

Figure 3:
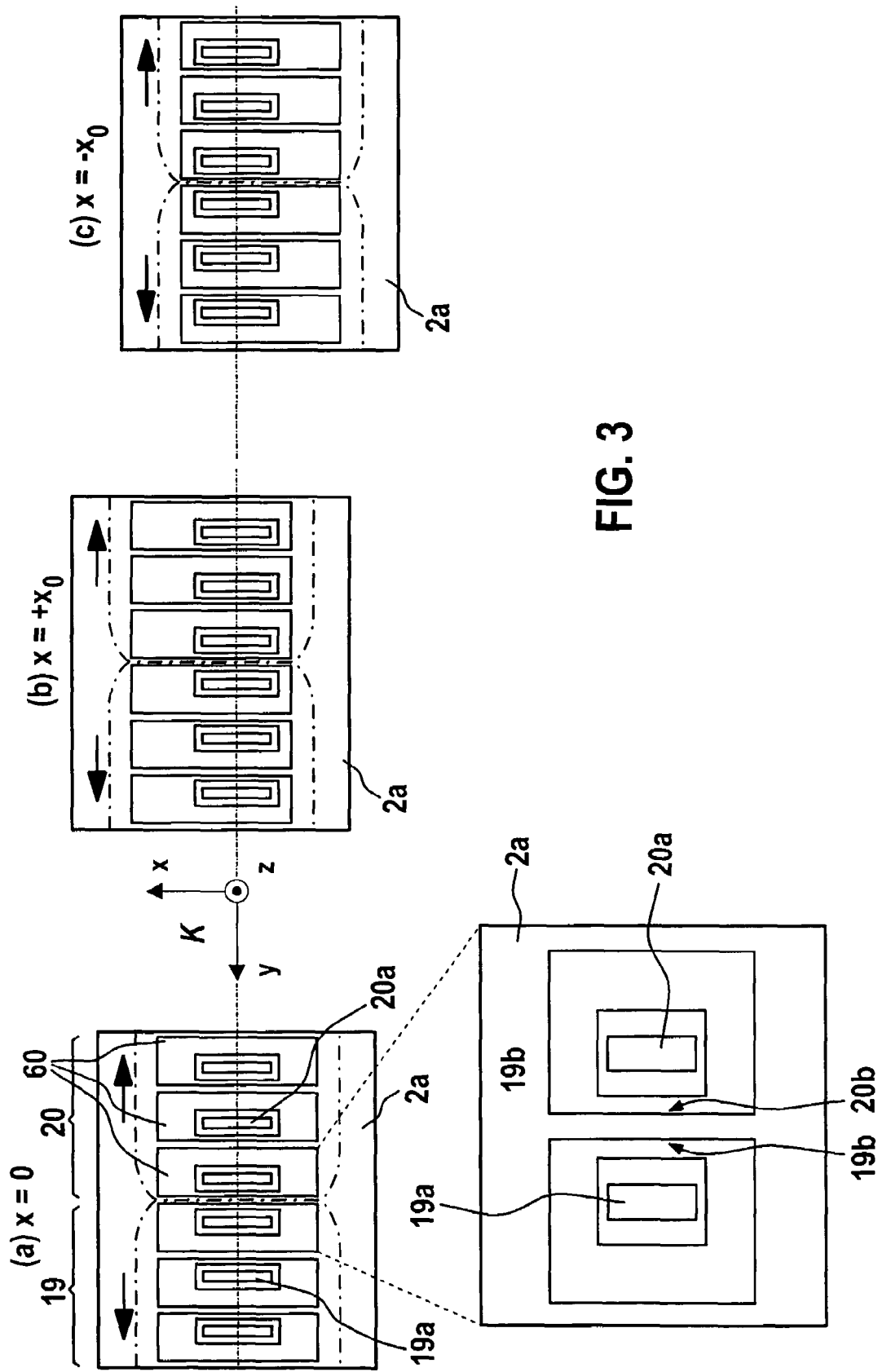
FIG. 3 shows a detailed view of compensation structures according to the present invention.

FIG. 3 shows detailed views of compensation structures 19, 20 as an example of their implementation at Coriolis element 2a. FIG. 3a shows a compensation structure 19, 20 with the Coriolis element 2a, without excursion of Coriolis element 2a from its equilibrium position (i.e. the displacement of Coriolis element 2a in the X direction vanishes, i.e. X=0. FIG. 3b shows compensation structure 19, 20 with Coriolis element 2a and having an excursion of Coriolis element 2a from its equilibrium position in the positive X direction, i.e. X=+Xo. FIG. 3c shows compensation structure 19, 20 with Coriolis element 2a having an excursion of Coriolis element 2a from its equilibrium position in the negative X direction, i.e. X=−Xo.

Each of substructures 19, 20 of the compensation structure is, according to the present invention, provided in particular as a capacitor device having a fifth electrode and a sixth electrode. Suitable regions 60 are cut out from Coriolis element 2a, which will be denoted as cutouts 60 below. According to the present invention, cutouts 60 are provided in particular as rectangular cutouts 60. The sidewalls of these cutouts 60 in each case form the sixth electrode (19b, 20b) of electrostatic compensation structure 19, 20. In cutouts 60, back-plate electrodes (plate capacitor structures) (19a, 20a) are provided as fifth electrodes, mechanically rigidly anchored to the substrate. According to the present invention, fifth electrodes 19a and also fifth electrodes 20a are in each case electrically connected to each other, especially via circuit-board conductors underneath the movable structures of the rotational rate sensor, fifth electrodes 19a, however, being provided electrically insulated from fifth electrodes 20a, but designed to be electrically insulated from the substrate, so that at these electrodes 19a, 20a electrical potentials desired from the outside may be applied with respect to the movable sensor structures.

The fixed fifth electrodes (19a, 20a) are provided asymmetrical within the cut out regions. This means that for first substructure 19 of a compensation structure fifth electrode 19a is, for example, provided closer to the right edge of corresponding cutout 60, and that for second substructure 20 of a compensation structure sixth electrode 20a is, for example, provided closer to the left edge of corresponding cutout 60. Thereby, in the position at rest of Coriolis element 2a, static forces are exerted on Coriolis element 2a in the Y direction when external quadrature compensation voltages (electrical DC voltages) are applied between fifth and sixth electrodes 19a. 20a, 19b, 20b. According to the present invention, the magnitude of these forces may be changed, in particular continuously, via the DC voltage between the fifth and sixth electrodes. The direction of the forces is predefined by the asymmetry of the arrangement. In this connection, first substructure 19 of the compensation structure shown in FIG. 3, is, according the present invention, in a position to exert pressures toward the left, which is shown in FIG. 3a by an arrow pointing left in the area of a brace belonging to reference numeral 19. Second substructure 20 of the compensation structure shown in FIG. 3, is, according the present invention, in a position to exert pressures toward the right, which is shown in FIG. 3a by an arrow pointing right in the area of a brace belonging to reference numeral 20.

In order to compensate for quadrature signals in the sensor element, it is provided in the present invention to apply an electrical compensation voltage at one of substructures 19, 20, for example, with respect to Coriolis element 2a, so as to achieve a static force effect on Coriolis element 2a. However, according to the present invention, it is also provided that one should provide compensation structures 19, 20 in such a way that a static force effect is achieved upon another or several of the sensor structures.

By the force effect of compensation structures 19, 20, the resulting forces on the structure do not change with a motion of Coriolis element 2a in the primary vibration having amplitude xo. That is why these forces are also called static compensation forces.

In FIG. 2 the effect of the compensation forces is explained in greater detail. In this context, the direction of the static compensation forces is again shown by arrows pointing left in the region of first substructure 19 and by arrows pointing right in the region of second substructure 20.

By the suitable positioning of compensation structures (19, 20), it is achieved that, because of the resulting forces on Cormass (2a), a torque about the center of gravity, denoted by reference symbol S in FIG. 2, of Coriolis element 2a is generated, but that no linear force component in the y direction is present. According to the present invention, because of voltages applied to the compensation structures, the force effect is such that a twisting of, in the present example, Coriolis element 2a, and thus also a twisting of the principal axis system of Coriolis element 2a is effected with respect to the substrate. In FIG. 2, first substructure 19 is provided on a the first side of Coriolis element 2a (which in FIG. 2 is shown in the upper area of the figure), rather in the right area of the figure, and second substructure 20 is provided on the first side rather in the left area of FIG. 2. On a second side, lying opposite the first side, of Coriolis element 2a (shown in FIG. 2 in the lower illustrated area), the opposite is true: first substructure 19 is provided rather in the left area of FIG. 2, and second substructure 20 is rather provided in the right area of FIG. 2. That is why, when a voltage is applied to first substructure 19, the result is a twisting of, or a torque on Coriolis element 2a in the clockwise direction in FIG. 2, and when a voltage is applied to second substructure 20, the result is a twisting of, or a torque on Coriolis element 2a in the anticlockwise direction in FIG. 2. Because of this, according to the present invention, it is advantageously possible to compensate for a twisting, predefined by manufacturing imperfections, etc, between the principal axis system of sensor element mechanics K and the principal axis system of means of detection KD, which in particular leads to quadrature compensation.

The positioning of the compensation structure on the second partial structure (FIG. 1, right) is produced by a symmetry operation (preferably a rotation by 180° about the overall center of gravity) from the first partial structure.

Additional exemplary embodiments for the present invention are mentioned briefly further on. In principle, they are the same as the exemplary embodiment shown, and they are therefore not explained further by illustrations.

By applying compensation structure 19, 20 inside detection element 3a, 3b, it is advantageous that there is no movement within the compensation structure during the primary vibration. By applying compensation structure 19, 20 inside driving masses 1a, 1b, analogously to the exemplary embodiment described, there is also no movement within the compensation structure during the primary vibration. However, the greater lever arm is an advantage for applying the torques, and consequently the increased compensation capability at the same electrical potentials.

A rotational rate sensor according to the present invention has especially the following advantages:

It is possible, according to the present invention, to carry out a quadrature compensation by making an electrical adjustment, as opposed to costly (iterative) and cost-laden physical balancing methods.

Reduction of the quadrature takes place in the sensor element itself. Consequently, no quadrature signals arise at the means of detection for the Coriolis effect, which results in clearly reduced requirements on the primary sensor signal evaluation and improved sensor performance. The present invention is based on the effect of static forces. This makes for an easy convertibility in surface micromechanics. The present invention may be used for all vibration gyroscopes whose primary and secondary vibrations proceed within the plane of the substrate. In addition, the present invention is compatible with the most varied sensor evaluation circuit concepts.

What is claimed is:

1. A rotational rate sensor, comprising:
   a substrate;
   a plurality of sensor elements including a Coriolis element situated over a surface of the substrate, wherein:
   the Coriolis element is capable of being induced to vibrate in parallel to a first axis,
   an excursion of the Coriolis element is detectable and is based on a Coriolis force in a second axis that is essentially perpendicular to the first axis,
   the first axis and the second axis are parallel to a surface of the substrate, and
   the plurality of sensor elements are at least partially movable with respect to the substrate and the plurality of sensor elements include a driving mass which performs movement solely in relation to the first axis; and
   a force conveying arrangement for conveying a static force effect between the substrate and at least one of the sensor elements, wherein the static force effect corresponds to a torque with respect to a third axis that is essentially perpendicular to the surface of the substrate.

2. The rotational rate sensor as recited in claim 1, wherein:
   the static force effect is exerted upon the Coriolis element.

3. The rotational rate sensor as recited in claim 1, wherein:
   the static force effect is exerted upon the driving mass.

4. The rotational rate sensor as recited in claim 1, wherein:
   the plurality of sensor elements includes a detection element upon which the static force effect is exerted.

5. The rotational rate sensor as recited in claim 1, wherein:
   the force-conveying arrangement includes a first substructure and a second substructure.

6. The rotational rate sensor as recited in claim 5, wherein:
   the first substructure and the second substructure are asymmetrical.

7. The rotational rate sensor as recited in claim 1, further comprising:
   a driving arrangement by which the Coriolis element is induced to vibrations parallel to the first axis; and
   an arrangement for detecting the excursion of the Coriolis element based on the Coriolis force in the second axis.

8. The rotational rate sensor as recited in claim 1, wherein the static force effect is exerted upon the Coriolis element, and the static force effect is exerted upon the driving mass.

9. The rotational rate sensor as recited in claim 8, wherein the force-conveying arrangement includes a first substructure and a second substructure, and the first substructure and the second substructure are asymmetrical.

10. The rotational rate sensor as recited in claim 8, further comprising:
    a driving arrangement by which the Coriolis element is induced to vibrations parallel to the first axis; and
    an arrangement for detecting the excursion of the Coriolis element based on the Coriolis force in the second axis.

11. The rotational rate sensor as recited in claim 1, wherein the static force effect is exerted upon the Coriolis element, and the plurality of sensor elements includes a detection element upon which the static force effect is exerted.

12. The rotational rate sensor as recited in claim 11, wherein the force-conveying arrangement includes a first substructure and a second substructure, and the first substructure and the second substructure are asymmetrical.

13. The rotational rate sensor as recited in claim 11, further comprising:
    a driving arrangement by which the Coriolis element is induced to vibrations parallel to the first axis; and
    an arrangement for detecting the excursion of the Coriolis element based on the Coriolis force in the second axis.

* * * * *